Nov. 27, 1951 C. J. DORR 2,576,216
SELECTIVE CALLING SYSTEM
Filed Feb. 5, 1947
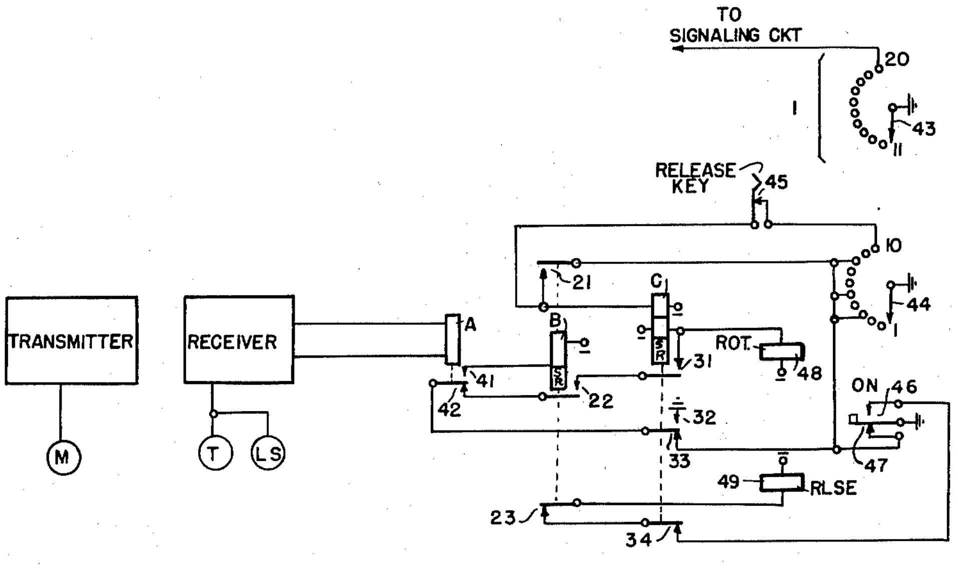
INVENTOR.
CLARENCE J. DORR
BY
Chas. W. Candy
ATTORNEY Patented Nov. 27, 1951

2,576,216

UNITED STATES PATENT OFFICE 2,576,216

SELECTIVE CALLING SYSTEM

Clarence J. Dorr, Tuckahoe, N. Y., assignor to Automatic Electric Laboratories, Inc., Chicago, Ill., a corporation of Delaware Application February 5, 1947, Serial No. 726,585

13 Claims. (Cl. 177—353)

The present invention relates to telephone and selective signaling systems in general, but is more particularly concerned with systems of the characters in which radio frequency impulses are employed for selecting any one of a group of remote or mobile stations and establishing a signaling and conversational channel between the control station and the selected mobile station or stations.

An object of this invention is the provision of a selecting circuit which requires for its operation a series of four digits to call any particular station or mobile unit, the total number of impulses in any series of four digits must always be ten. Thus providing eighty-four separate codes for the selection of any particular one of eighty-four stations or units by the simple operation of rotating an ordinary calling dial. Additional three digit codes are available for calling specified groups of stations or mobile units, groups of from two to seven stations per group on a three digit code basis. In order to signal all stations simultaneously in the event of an emergency, ten impulses in a single series are sent thereby causing the operation of the signal device in all stations, by simply dialing the simple digit zero.

It is the purpose of this signaling circuit to provide means whereby the equipment at all receiving stations will respond to all signals incoming from the central station or control point, with which its relay circuit is tuned. However, only that receiving station or those receiving stations, in which their bank connections on the rotary switch correspond with the code signal being transmitted, will complete the selective signaling circuit.

Other objects and the novel features of the invention, which are not specifically mentioned at this time, will be apparent from the following description and the appended claims, when studied in conjunction with the accompanying single sheet of drawing, which by means of the usual circuit diagrams and symbols, shows one embodiment of this invention.

In the drawing, the box indicated by the word "transmitter" may be any well known radio transmitter capable of transmitting a carrier wave or tone, suitable as a carrier of signals. The letter M indicates a microphone, with which is associated an ordinary dial (not shown) or impulse sender which is well known to the art in its use in the automatic telephone system. Associated with the microphone will be the usual telephone receiver and a switch, operated in a similar manner to the switch-hook of an ordinary telephone, to assure that after the equipment has been in use in transmitting a message to a remote station, the circuit will be restored to normal, prior to instituting a second call, by the simple operation of hanging up the receiver.

Another box indicates a radio receiver with which is associated a telephone instrument and a loud speaker indicated by the letters T and L. S. respectively.

The receiving station illustrated in the drawing is one of a large number of receiving stations capable of being controlled and operated from the transmitting station.

A rotary step-by-step switch comprising two levels of ten bank contacts each and their cooperating wipers is associated with each receiving station. This type of switch is well known in the telephone art and is commonly referred to as a minor switch having a rotary magnet for rotating the wipers step-by-step and a release magnet for restoring the wipers to their normal positions. Each switch has a set of off-normal springs which are operated as soon as the wipers step from their normal positions and which springs are restored to the position shown in the drawing when the wipers are restored to their normal positions.

Three relays, A, B and C are associated with each switch, the relays B and C being slow to release as indicated by the letters SR. Relay A is a fast to operate relay and is designed to operate its armature in response to the transmission of a tone to the audio output circuit and to release its armature each time the tone is interrupted. Improved circuit interconnections between the relays and the switch bank are provided in accordance with the present invention to control the desired operation and functions of the switch to selectively operate the signalling device at the desired station or stations.

Relay A has been inserted in the audio output circuit (not shown) of the receiver at each station and is tuned to respond to a frequency wave and to operate the relays. The relay is released in response to interruptions in the carrier wave caused by impulses from the dial at a transmitting station. The incoming frequency tone causes the energization of relay A causing its armature to operate and close contact 41 energizing relay B through the following circuit: battery, winding of relay B, contact 41, contact 33, contact 47, to ground. Relay B operates closing two circuits, contact 21 which causes relay C to operate over the following circuit: battery, one winding of relay C, contact 21, contact 47, to ground. It will be noted that relays C and B are slow-to-release and therefore will not follow the impulses, which will be produced by the opening and closing of contact 41, when relay A responds to the impulses from the dial at the transmitting station. It will be noted by the wiring of one bank level of the rotary switch at this particular station, that the number of this receiving station is 3232 and assuming that the control station wishes to communicate with this remote station or mobile unit, the operator would dial these four digits in the order named.

Dialing the first digit three would cause relay A to operate its armature three times thus opening and closing each of the contacts 41 and 42 three times. Contact 42 completes a circuit to the rotary magnet 48, through the following circuit: battery, winding of rotary magnet 48, contacts 31 and 22 (relays B and C having operated when relay A was first energized), contact 42, contact 32, to ground. A parallel circuit for maintaining relay C in operated position during the impulsing period is provided through the lower winding of relay C. Relay C at contacts 32 connects ground to the pulsing circuit so that such pulsing will not be interrupted when the off-normal springs 47 operate on the first rotary step of the switch wipers. The rotary magnet causes the wipers of the rotary switch to be moved over the respective bank contacts, step-by-step. Wiper 44 will therefore be moved to the third contact in the bank and as this bank contact is wired to the common holding circuit for relay C, the wiper will furnish ground to hold relay C in operated position, through contact 21 on relay B, winding of relay C, to battery. The second, third and fourth digits, that is digit two, digit three and digit two, will now be dialed causing the wiper 44 to be moved step-by-step, first from contact three to contact five, from contact five to contact eight and finally from contact eight to contact ten. It will be noted that when wiper 44 momentarily rests on the contacts three, five and eight in turn between transmission of successive digits, relay C is held through the common holding circuit by ground from the wiper, as explained above via contact 21. However, when wiper 44 reaches bank contact ten, the holding circuit is via contact 45 on the release key. After transmitting the code digits for the desired station the operator at the transmitting station disconnects the tone wave before the transmission of speech.

It will be noted here that the wiper 43 has moved step-by-step simultaneously with wiper 44 and therefore ground on wiper 43 which is now resting on the last contact of the bank, contact number 20, will be extended over the alarm circuit (not shown) to sound the alarm or to operate a signalling device to inform the attendant at the sub-station or mobile unit, that he should take note of the incoming message.

The removal of the tone wave causes relays A at all of the receiving stations to restore and open the circuits of their associated B relays thereat. At all of the stations, except the selected station, the minor switches will restore their wipers to normal in a manner more fully described hereinafter. However, at the selected station, the relay C is held operated with the result that the associated minor switch is held in operated position until released by the called attendant operating the release key on answering the call.

After being signalled the called attendant may at any time manually operate the release key to remove ground from the winding of relay C and relay C will restore. Since relays A and B have both released as a result of the disconnection of the tone wave, the release of relay C closes the circuit of the release magnet 49 as follows: battery, release magnet winding, contact 23 on relay B, contact 34 on relay C, contact 46 of the off-normal spring set (which is now operated) to ground. The release magnet operates to restore the wipers to their normal positions. The release key may be a part of the hook-switch of the telephone and in that event the holding circuit would be opened by the act of removing the receiver from its cradle when the call is answered.

Conversation between the calling and called stations may now proceed in any well known manner.

It should be noted here that when a series of four digits are transmitted to the relays A, the two wipers of each rotary switch, in all stations tuned to the particular transmitting station, will be moved in accordance with the impulses representing such digits. A number of these wipers at different stations will come to rest on bank contacts which are wired into the common holding circuit of their respective relays C and therefore these C relays will be held in operated position and the two wipers 43 and 44 at a number of stations will remain on this advanced bank contact and will again be moved forward in response to the dialing of the second digit.

Each station has its holding circuit for the C relay multipled to the bank contacts, accessible to the wipers, such as wiper 44, in accordance with the first three digits designating such station. That is, in the station 3232 illustrated in the drawing, the holding circuit for relay C is multiple to the third, the fifth and the eighth bank contacts accessible to wiper 44. The tenth bank contacts in all stations are connected through the release key to relay C. Other stations have different multiple connections for the holding circuit. For example, station 3223 would have its holding circuit for the first three digits multipled to the third, the fifth and the seventh bank contacts and station 1117 would have its first, second and third contacts, accessible to wiper 44, multipled and connected to the holding circuit of the relay C thereat. In a similar manner the remaining stations would have different multiple connections to the switch banks for the holding circuit for the respective C relays in such switches.

On those switches whose wipers 44 did not connect with the common holding circuit for their relays C such relays will restore after the impulsing period of the first digit. When relay C of these switches release there is no circuit for holding the relays B energized with the result that the B relays in these switches restore and close the release circuit for their respective release magnets by way of contacts 46, 34 and 23. When the switches reach their normal positions, off-normal springs 46 open the respective release magnet circuits and close contacts 47 to re-operate the B relay of these switches. The impulses of the second digit will cause the rotary magnets 48 of all rotary switches to move their wipers forward step-by-step and, as before, the relays C will be held in operated position only on those switches whose wipers 44 stop on a contact wired to the common holding circuit of relay C. The C relays on the other switches will restore and thus release the switch wipers as previously described. In the same manner as just described all of the switches are stepped in response to the third and fourth digits and all of the switches except the desired one, or desired group, corresponding to the transmitted code will be released. Only the switch, or switches having the multipled holding circuit for relay C corresponding to the transmitted code will be successively advanced to engage its, or their, tenth bank contacts. The particular switch which has been accumulatively operated to its tenth bank contact completes a circuit from ground on wiper 43 through the tenth contact of one level of the rotary switch to the alarm circuit (not shown) to sound the alarm in the particular station desired.

It will be noted that the total number of impulses in any one of the eighty-four code signals is always ten, the smallest number of impulses being one and the largest seven. This unique method of combining groups of impulses, from one to seven, with the total always ten, not only allows the individual selection of any one station from a large group but also arranges for group calling. As an example, the first number in the series of eighty-four codes is 1117, the second 1126, the third 1135 on down to 1171 for the first seven stations and, by dialing the three digits 118, a group of seven stations could be signaled at one time. A chart is re-produced hereunder showing the eighty-four different numbers for eighty-four stations.

| A | B | C | D | E | F | G |
|---|---|---|---|---|---|---|
| 1117 | 2116 | 3115 | 4114 | 5113 | 6112 | 7111 |
| 1126 | 2125 | 3124 | 4123 | 5122 | 6121 | |
| 1135 | 2134 | 3133 | 4132 | 5131 | | |
| 1144 | 2143 | 3142 | 4141 | | 6211 | |
| 1153 | 2152 | 3151 | | 5212 | | |
| 1162 | 2161 | | 4213 | 5221 | | |
| 1171 | | 3214 | 4222 | | | |
| | 2215 | 3223 | 4231 | 5311 | | |
| 1216 | 2224 | 3232 | | | | |
| 1225 | 2233 | 3241 | 4312 | | | |
| 1234 | 2242 | | 4321 | | | |
| 1243 | 2251 | 3313 | | | | |
| 1252 | | 3322 | 4411 | | | |
| 1261 | 2314 | 3331 | | | | |
| | 2323 | | | | | |
| 1315 | 2332 | 3412 | | | | |
| 1324 | 2341 | 3421 | | | | |
| 1333 | | | | | | |
| 1342 | 2413 | 3511 | | | | |
| 1351 | 2422 | | | | | |
| | 2431 | | | | | |
| 1414 | | | | | | |
| 1423 | 2512 | | | | | |
| 1432 | 2521 | | | | | |
| 1441 | | | | | | |
| | 2611 | | | | | |
| 1513 | | | | | | |
| 1522 | | | | | | |
| 1531 | | | | | | |
| 1612 | | | | | | |
| 1621 | | | | | | |
| 1711 | No of codes in major groups | | | | | |
| 28 | 21 | 15 | 10 | 6 | 3 | 1 |

It will be noted in the chart above that the first twenty-eight stations in column A have the figure "1" as their first digit and as the total of the other three digits in each number is nine, these twenty-eight stations may be called as a group by dialing the two digits "1" and "9," to the exclusion of all other stations. Again, the first six station numbers in column B may be called as a group, to the exclusion of all others, by dialing 217. An examination of the chart discloses many possible combinations which can be called as a group, ranging from two stations to twenty-eight stations per group using either two or three digit codes.

Having described the invention and what is considered to be new and is desired to be protected by Letters Patent is set forth in the following claims:

1. In a selective switch having a bank of contacts, a wiper having a normal position and operable step by step over said contacts, off-normal springs having a normal position and operable to an off-normal position in response to the movement of said wiper from its normal position, a line relay energized in response to the seizure of said switch, a release relay, an initial energizing circuit including said off-normal springs in normal position for energizing said release relay completed in response to the energization of said line relay, a holding relay, an initial energizing circuit including said off-normal springs in normal position for energizing said holding relay completed in response to the energization of said release relay, a new circuit independent of said off-normal springs for maintaining said release relay in energized position completed in response to the energization of said holding relay, means responsive to a series of impulses transmitted to said switch for de-energizing and re-energizing said line relay a number of times corresponding to the number of impulses in said series, means responsive to the de-energizations of said line relay for operating said wiper from its normal position step by step and for stopping said wiper in engagement with one of said bank contacts, an impulsing circuit independent of said off-normal springs for maintaining said holding relay in operated position during the impulsing period, a multiple circuit multipled to certain ones of said bank contacts, a holding circuit including said multiple circuit and said wiper completed after said stepping operation for maintaining said holding relay in energized position in case said wiper stops in engagement with a bank contact multipled to said multiple circuit, said holding relay restoring in case said wiper fails to stop in engagement with a bank contact multipled to said multiple circuit for opening said new circuit to restore said release relay, and a release circuit including said off-normal springs in off-normal position completed in response to the restoration of said holding and release relays for restoring said wiper to its normal position.

2. In a selective switch having a bank of contacts, a line relay energized in response to the seizure of said switch, a release relay energized in response to the energization of said line relay, a holding relay energized in response to the energization of said release relay, means responsive to a series of impulses transmitted to said switch for de-energizing and re-energizing said line relay a number of times corresponding to the number of impulses in said series, a wiper operated step by step over said bank contacts in response to the de-energizations of said line relay and stopped in engagement with the one of said bank contacts corresponding to the number of de-energizations of said line relay, a first circuit controlled by said holding relay for maintaining said release relay in energized position, a second circuit for maintaining said holding relay in energized position during said stepping operation, multiple connections connected to certain ones of said bank contacts, a third circuit including said multiple connections and said wiper completed after said stepping operation for maintaining said holding relay in energized position in case said wiper stops in engagement with a bank contact included in said multiple connections, said holding relay restoring in case said wiper fails to stop in engagement with a bank contact included in said multiple connections to open said first circuit to thereby restore said release relay, and a release circuit completed in response to the restoration of said holding and release relays to restore said wipers to normal.

3. In a selective switch having an individual four digit designation number, a bank of contacts, a wiper for engaging said contacts; an individual holding circuit multiplied to a first bank contact corresponding to the first digit of the four digit designation number, to a second bank contact corresponding to the sum of the first and second digits of the designation number, and to a third bank contact corresponding to the sum of the first, second and third digits of the designation number; means responsive to the receipt of the first three digits of said individual four digit designation number for operating said switch wiper to successively stop in engagement with said first, second and third bank contacts multipled to said holding circuit, means for holding said switch wiper in its respective operated positions after receipt of each digit in case said switch wiper engages a bank contact multipled to said holding circuit, means for automatically releasing said switch wiper to normal after each digit in case said switch wiper fails to stop in engagement with a bank contact multipled to said holding circuit, a signalling device, and means responsive to the receipt of said fourth digit in case said switch wiper is held in operated position after each of the first three digits for operating said signalling device.

4. In a selective switch, a line relay and a holding relay energized in response to the seizure of said switch, a bank of contacts, a wiper for successively engaging said contacts, means for intermittently operating said line relay, means responsive to the intermittent operation of said line relay for operating said wiper step by step and to stop said wiper into engagement with one of said bank contacts corresponding to the number of intermittent operations of said line relay, multiple connections connected to certain ones of said bank contacts, a circuit including said multiple connections and said wiper completed after said stepping operation for maintaining said holding relay in operated position in case said wiper stops in engagement with a bank contact included in said multiple connections, means for releasing said holding relay in case said wiper fails to stop in engagement with a bank contact included in said multiple connections, and means responsive to the release of said holding relay for releasing said wiper to normal position.

5. In a selective switch having a wiper, a line relay energized in response to the seizure of said switch, a release relay energized in response to the energization of said line relay, a holding relay energized in response to the energization of said release relay, means responsive to the receipt of a series of impulses for de-energizing and re-energizing said line relay a number of times corresponding to the number of impulses in said series, stepping means responsive to the de-energizations of said line relay for operating said wiper one step for each line relay de-energization, an impulsing circuit for maintaining said holding relay in energized position during said stepping operation, a holding circuit including said wiper for maintaining said holding relay in energized position after said stepping operation, and a release circuit for restoring said wiper to normal controlled jointly by said release and holding relays and completed only in response to the de-energization of both said release and holding relays.

6. In a selective switch having a wiper, a line and a release relay energized in response to the seizure of said switch, means responsive to the receipt of a series of impulses for de-energizing and re-energizing said line relay a number of times corresponding to the number of impulses in said series, stepping means responsive to the de-energizations of said line relay for operating said wiper a number of steps corresponding to the number of said line relay de-energizations, a holding relay maintained in energized position during said stepping operation, a holding circuit including said wiper for maintaining said holding relay in energized position after said stepping operation, and a release circuit for restoring said wiper to normal controlled jointly by said release and holding relays.

7. In a selective switch having a wiper, a line relay and a holding relay energized in response to the seizure of said switch, means responsive to the receipt of a series of impulses for de-energizing and re-energizing said line relay a number of times corresponding to the number of impulses in said series, stepping means responsive to the de-energizations of said line relay for operating said wiper a number of steps corresponding to the number of said line relay de-energizations, means for maintaining said holding relay in energized position during said stepping operation, a holding circuit including said wiper for maintaining said holding relay in energized position after said stepping operation, and a release circuit for restoring said wiper to normal controlled by said holding relay.

8. In a selective switch having a bank of contacts, a wiper for successively engaging said contacts, a holding relay operated in response to the seizure of said switch, means for operating said wiper step by step and for stopping said wiper in engagement with one of said bank contacts, multiple connections connected to certain ones of said bank contacts, means for maintaining said holding relay in operated position during the stepping operations of said wiper, a circuit for maintaining said holding relay in operated position after said stepping operation in case said wiper stops in engagement with a bank contact included in said multiple connections, and means for releasing said wiper to normal in response to the release of said holding relay in case said holding relay restores after said stepping operation.

9. In a selective switch having an individual multi-digit designation number and a bank of contacts and a wiper operative from normal to engage said bank contacts, a holding circuit multipled to a plurality of said bank contacts respectively corresponding to the first digit and to the sum of the first and the successive digit or digits preceding the last digit of said individual multi-digit designation number, means responsive to the receipt of the first and the successive digit or digits preceding the last digit of said individual multi-digit designation number for operating said switch wiper to stop successively in engagement with the individual ones of said bank contacts multipled to said holding circuit, means for holding said switch wiper in its respective operated positions after receipt of each digit in case said switch wiper stops in engagement with one of said bank contacts multipled to said holding circuit, means for automatically releasing said switch wiper to normal after each digit in case said switch wiper fails to stop in engagement with one of said bank contacts multipled to said holding circuit, a signaling device, and means responsive to the receipt of the last digit in case said switch wiper is held in operated position after each of the preceding digits of said individual multi-digit designation number for operating said signaling device.

10. In a selective switch having a bank of contacts, a line relay energized in response to the seizure of said switch, a release relay energized in response to the energization of said line relay, a holding relay, means responsive to a series of impulses transmitted to said switch for de-energizing and re-energizing said line relay a number of times corresponding to the number of impulses in said series, a wiper operated step by step over said bank contacts in response to the de-energizations of said line relay and stopped in engagement with the one of said bank contacts corresponding to the number of de-energizations of said line relay, a circuit for maintaining said holding relay in energized position during said stepping operation, multiple connections connected to certain ones of said bank contacts, a circuit including said multiple connections and said wiper completed after said stepping operation for maintaining said holding relay in energized position in case said wiper stops in engagement with a bank contact included in said multiple connections, said holding relay restoring in case said wiper fails to stop in engagement with a bank contact included in said multiple connections, and a release circuit completed in response to the restoration of said holding and release relays to restore said wipers to normal.

11. In a selective switch, a line relay energized in response to the seizure of said switch and a holding relay, a bank of contacts, a wiper for successively engaging said contacts, means for intermittently operating said line relay, means responsive to the intermittent operation of said line relay for operating said wiper step by step and to step said wiper into engagement with one of said bank contacts corresponding to the number of intermittent operations of said line relay, multiple connections connected to certain ones of said bank contacts, a circuit including said multiple connections and said wiper completed after said stepping operation for maintaining said holding relay in operated position in case said wiper stops in engagement with a bank contact included in said multiple connections, means for releasing said holding relay in case said wiper fails to stop in engagement with a bank contact included in said multiple connections, and means responsive to the release of said holding relay for releasing said wiper to normal position.

12. In a selective switch having a wiper, a line relay energized in response to the seizure of said switch, a release relay energized in response to the energization of said line relay, a holding relay, means responsive to the receipt of a series of impulses for de-energizing and re-energizing said line relay a number of times corresponding to the number of impulses in said series, stepping means responsive to the de-energizations of said line relay for operating said wiper one step for each line relay de-energization, and impulsing circuit for maintaining said holding relay in energized position during said stepping operation, a holding circuit including said wiper for maintaining said holding relay in energized position after said stepping operation, and a release circuit for restoring said wiper to normal controlled jointly by said release and holding relays.

13. A selective switch comprising a plurality of impulse registering contacts having a normal condition, a line relay, a release relay, means responsive to seizure of said switch for energizing said line and release relays, means responsive to the receipt of a series of impulses for de-energizing and re-energizing said line relay a number of times corresponding to the number of impulses in said series, stepping means responsive to the de-energizations of said line relay for sequentially changing the condition of said impulse registering contacts, whereby the last-changed one of said impulse registering contacts corresponds to the number of de-energizations of said line relay, a hold relay, means controlled during said stepping operation for energizing said hold relay, means including said last-changed one of said impulse registering contacts for energizing said hold relay after said stepping operation, and a release circuit controlled jointly by said release relay and said hold relay for restoring said impulse registering contacts to said normal condition.

CLARENCE J. DORR.

REFERENCES CITED

The following references are of record in the file of this patent:

UNITED STATES PATENTS

| Number | Name | Date |
|---|---|---|
| 1,343,256 | Field | June 15, 1920 |
| 1,882,010 | Hershey | Oct. 11, 1932 |
| 2,229,249 | Lewis | Jan. 21, 1941 |